US007689714B1

(12) United States Patent
Zaumen

(10) Patent No.: US 7,689,714 B1
(45) Date of Patent: *Mar. 30, 2010

(54) LOAD BALANCING COMPUTATIONS IN A MULTIPROCESSOR SYSTEM

(75) Inventor: William T. Zaumen, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1541 days.

This patent is subject to a terminal disclaimer.

(21) Appl. No.: 10/984,708

(22) Filed: Nov. 9, 2004

(51) Int. Cl.
*G06F 15/173* (2006.01)

(52) U.S. Cl. .................. 709/241; 709/220; 709/221; 709/238; 709/239; 709/240; 709/242; 709/222; 709/223; 709/224; 370/351; 370/352; 370/353; 370/354; 370/356

(58) Field of Classification Search ......... 709/238–344, 709/220–224; 370/351, 352–356
See application file for complete search history.

(56) References Cited

U.S. PATENT DOCUMENTS

| | | | |
|---|---|---|---|
| 6,658,479 B1 | 12/2003 | Zaumen et al. | |
| 6,901,445 B2 * | 5/2005 | McCanne et al. | 709/225 |
| 7,111,074 B2 * | 9/2006 | Basturk | 709/241 |
| 7,400,583 B2 * | 7/2008 | Friskney et al. | 370/235 |

OTHER PUBLICATIONS

Zaumen, William T., Vutukury, Srinivas, Garcia-Luna-Aceves, J.J., Load-Balanced Anycast Routing in Computer Networks, Sunlabs Report, 2000, issue 200, Sun Microsystems, Inc.

* cited by examiner

*Primary Examiner*—Nathan Flynn
*Assistant Examiner*—Mohammad A Siddiqi
(74) *Attorney, Agent, or Firm*—Park, Vaughan & Fleming LLP

(57) ABSTRACT

A system and method for load-balancing routing of a computation within a multiprocessor system. The computation includes multiple branches of execution, not just a linear sequence of steps, and thus cannot be efficiently routed by existing minimum-delay routing schemes. The cost of a single step of the computation is calculated, possibly using a ratio of outgoing data rates from the step to the incoming data rate. That cost may then be scaled for different branches of execution of the computation leading to or from that single step. For example, the calculated cost may be multiplied by each branch's probability of being executed.

21 Claims, 4 Drawing Sheets

System 200

LOAD BALANCING COMPUTATIONS IN A MULTIPROCESSOR SYSTEM

BACKGROUND

This invention relates to the field of computer systems. More particularly, a system and methods are provided for load balancing computations, or portions of a computation, among processors in a multiprocessor system.

In a multiprocessor computer, or other tightly coupled system comprising multiple processors, each processor has access to memory for storing and working on data. Such memory may be dedicated to a particular processor (e.g., a local cache) or may be shared among a plurality of processors.

When the multiprocessor system is employed to perform a computation, different processors may be used to execute different portions of the computation. For example, one processor may be close to an edge of the system and have the most efficient connection to an external communication link. That processor may therefore be favored to perform processing that requires external communication. Another processor may be faster than other processors, and thus be more efficient at performing difficult calculations that require little or no input/output.

Thus, when determining how to route a computation in a multiprocessor system—i.e., how to divide the portions or steps of the computation among the processors—the strengths of the various processors may be considered. In addition, however, the costs associated with performing computational steps at different processors must also be considered. In particular, the cost of moving data between different areas of memory, so that different processors can use the data, must be considered. Congestion in the system must also be considered, along with how heavily tasked the various processors are, and so on.

Unfortunately, existing methods of determining how to route a computation among multiple processors are limited to computations that are deterministic—computations in which the steps of the computation are aligned serially, with no branching. In particular, if a computation may involve different steps or different sequences of steps during different executions, existing methods cannot provide adequate routing. Meanwhile, the computations that can benefit most from a multiprocessor environment (e.g., modeling, simulation) are least likely to execute in a deterministic fashion.

Thus, there is a need for a system and a method for determining how to route a multi-step computation among processors in a multiprocessor environment, wherein execution of the computation can branch among different paths.

SUMMARY

In one embodiment of the invention, a system and methods are provided for load-balancing routing and execution of a computation within a multiprocessor system. The computation includes multiple branches of execution, not just a linear sequence of steps, and thus cannot be efficiently routed by existing minimum-delay routing schemes.

In this embodiment, the cost of a single step of the computation is calculated, possibly as a ratio of outgoing data rates from the step to an incoming data rate, and possibly including the cost of performing that processing step. That cost may then be scaled for different branches of execution of the computation leading to or from that single step. For example, the calculated cost may be multiplied by each branch's probability of being executed.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for load balancing the execution of a multi-step computation, or a set of computations, in a multiprocessor environment. The multiple processors may be part of a single multi-processor computer system, or may comprise a cluster, grid or other arrangement.

The computation comprises a set of steps that do not execute in a deterministic manner, or at least do not always execute in a deterministic manner. Thus, instead of each step of the computation always being followed by the same subsequent step, each step may be followed by any number of branches of execution leading to different steps. Each branch has an associated probability of being executed, which may be determined through approximation, tracking of past and/or present executions of the computation, etc.

Existing minimum-delay routing and load-balancing algorithms are designed to determine how to route execution of a computation or program within a network of computer systems, but only if the computation comprises steps that are linearly aligned. One particular algorithm for performing load-balanced routing of a linear sequence of computational steps is described in U.S. Pat. No. 6,658,479 (the '479 patent), entitled "Load-Balanced Anycasting and Routing in a Network." The '479 patent was filed on Jun. 30, 2000, issued on Dec. 2, 2003 and is hereby incorporated by reference into the present application.

As an example of a linear computation, the assembly of a web page may be performed as a series of pipelined steps such as receiving a request, retrieving components of the requested page, serving the page to the requestor, etc. Each step in the process always leads to one other step; there is normally no branching.

Figure 1A:
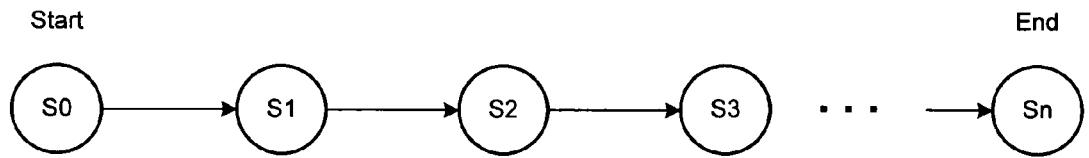
FIG. 1A is a flowgraph of computation consisting of a pipeline of linear steps.

FIG. 1A depicts a computation exhibiting a pipeline configuration, which can be handled by an existing minimum-delay routing algorithm. For each link or edge in the flowgraph of FIG. 1A, the routing and load-balancing calculations described below may be performed.

Figure 1B:
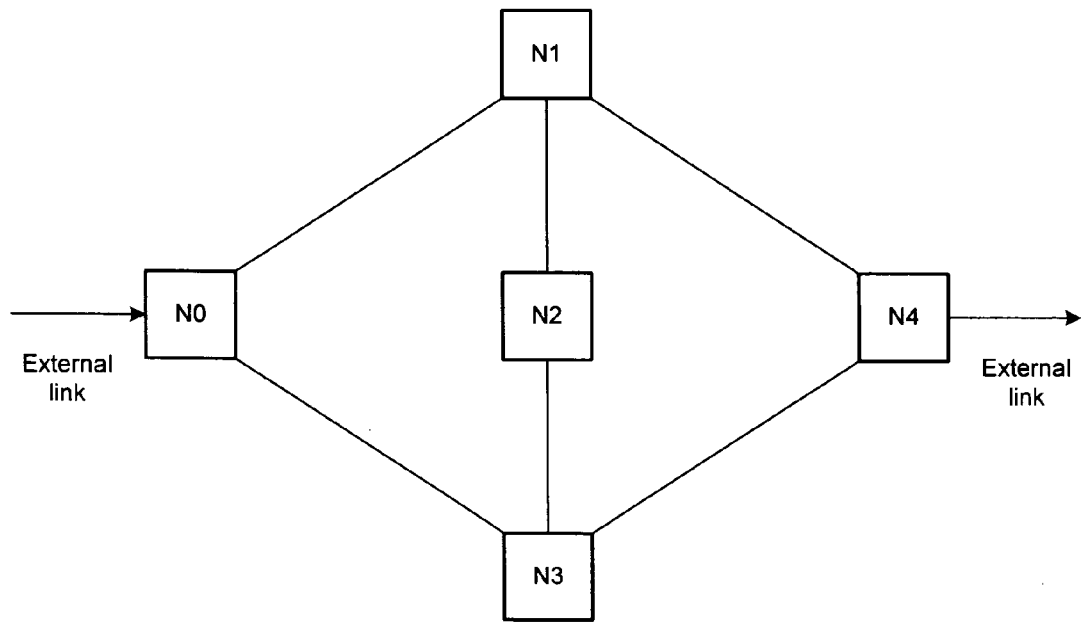
FIG. 1B is a graph of networked computer nodes in which the computation of FIG. 1A may be routed for execution.

The networked computer systems can also be graphed, as in FIG. 1B. Each computer node of the network graph can perform a subset (ranging from all to none) of the processing steps {S0, S1, S2, ..., Sn}. The computation of FIG. 1A may end at any of several nodes in the network of FIG. 1B. Node N4 is coupled to an external communication link and therefore may be a good ending node for a computation resulting in output from the network (e.g., serving a web page).

An algorithm described in the '479 patent proceeds by working backwards from the ending node(s). The possible end nodes (e.g., N4) advertise a distance of 0 to their neighbors. Each communication link between a node and a neighbor has a cost associated with it that is equal to the marginal delay for traffic flowing through that link. The marginal delay may be defined as the derivative of the total delay for that link with respect to the rate of data flowing through the link. A loop-free routing algorithm such as DASM (Diffusing Algorithm for Shortest Multipath) may be used to provide multiple loop-free paths between nodes, with the cost along a given path being the sum of the link costs for each link along that path.

Given these loop-free paths, at each point an algorithm of the '479 patent computes at each computer system node the fraction of traffic—the branching probability—that should go to each of its neighbors. Note that this branching refers strictly to the routing of the computation through the network of computer systems, not branching of execution within the computation. Illustratively, only those neighbors along loop-free paths will get a non-zero fraction of the traffic. As this occurs, any change to the way traffic is split itself changes the load on each link, and hence the link cost.

At each step of the computation, some subset of the nodes in the network is capable of performing the next step (i.e., the preceding step, since we are working backward). For each of these nodes, we may take the minimum distance to the destination nodes just computed, multiply that by the ratio of traffic leaving the node to traffic entering the node, and add the marginal delay per byte associated with the processing at that node. This generates a new set of initial distances instead of 0, and a new instance of the routing computation is run for that stage. By working backwards, we eventually obtain the branching probabilities at the starting nodes. Note that while the routing computations treat each step of the computation separately, the marginal delays are based on the total traffic flowing through each node, and thus provide feedback between stages.

Thus, in a method such as that provided by the '479 patent, each processor performing a computational step i+1 in a pipelined sequence of steps will provide a "destination" cost for the phase connecting step i to step i+1. The routing algorithm propagates this cost backwards, increasing it at each routing device through which the computation is routed, to provide a cost at each processor capable of performing step i. The costs of step i will generally be different at each processor capable of performing that step.

One skilled in the art will recognize, however, that most applications or computations cannot be arranged as linear sequences of steps or events. Most applications appear more in the form of a directed acyclic graph. Methods described in the '479 patent can be augmented, through an embodiment of the present invention, with the ability to handle non-linear sequences of steps.

Figure 2:
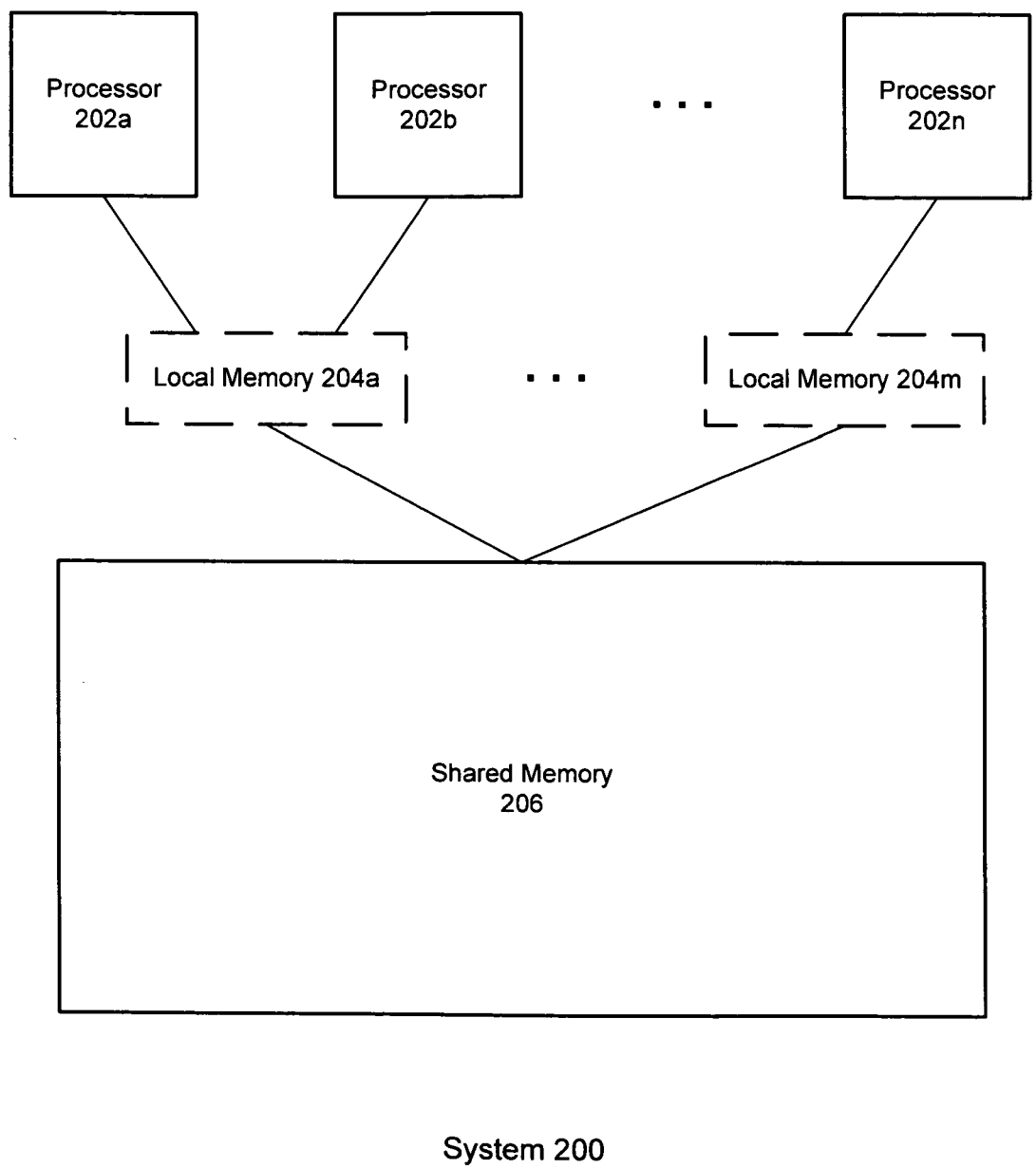
FIG. 2 is a block diagram depicting a multiprocessor system for executing a computation, in accordance with an embodiment of the present invention.

FIG. 2 is a block diagram of a multiprocessor system in which an embodiment of the invention may be implemented. System 200 includes a set of processors 202a-202n, optional local storage 204a-204m for any or all of processors, and shared memory 206. Local memories or storage 204 may comprise any level of cache (e.g., L1, L2). Local and shared memories may be of any size, and may comprise solid-state memory (e.g., RAM) and/or mechanical devices (e.g., a disk drive).

For each processor 202, some portion of shared memory 206 (and/or a local memory 204) will have less latency than other areas of memory. Similarly, different areas of shared memory 206 (and/or different local memories 204) will have less latency when communicating with certain processors than with others.

Figure 3A:
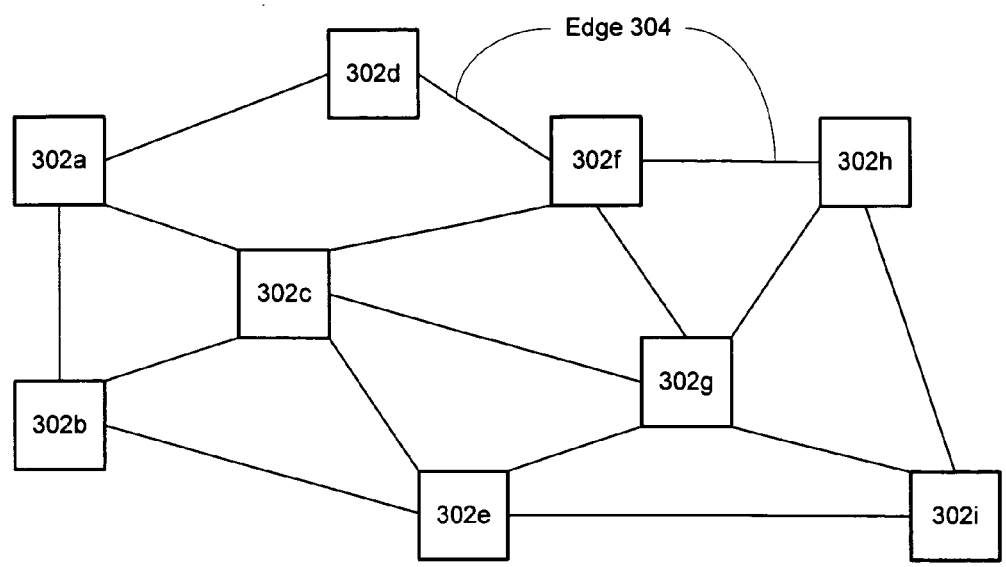
FIG. 3A is a graph of processor nodes in a multiprocessor computing system, according to one embodiment of the invention.

FIG. 3A is a graph representing an illustrative multiprocessor system for performing a multi-step computation. As described above, each processor may have access to any amount of local and/or shared memory. Therefore, each node 302 may represent a separate processor or a separate combination of a processor and an area of memory.

During a computation performed on the multiprocessor system, computational data could be stored in one area of memory while steps of the computation are performed at different processors, or the data could be moved among memory areas (e.g., different local memories, different areas of a shared memory) as computational steps are routed among processors. In one embodiment of the invention, when a step of a computation is performed at a particular processor, data for that step are moved to an area of memory close to that processor—an area having relatively low latency with the processor.

In particular, when performing the computation in the multiprocessor system, data can be moved from one area of memory to another area (e.g., a local cache) closer to a processor selected to perform a step of the computation. Or, the data could remain in a current memory location while the same or a different processor performs the step. Thus, different nodes of the graph of FIG. 3A could be employed to model different combinations of memory locations for the data and processors for working with the data. Routing and load-balancing decisions are therefore more flexible and can be more efficient.

Figure 3B:
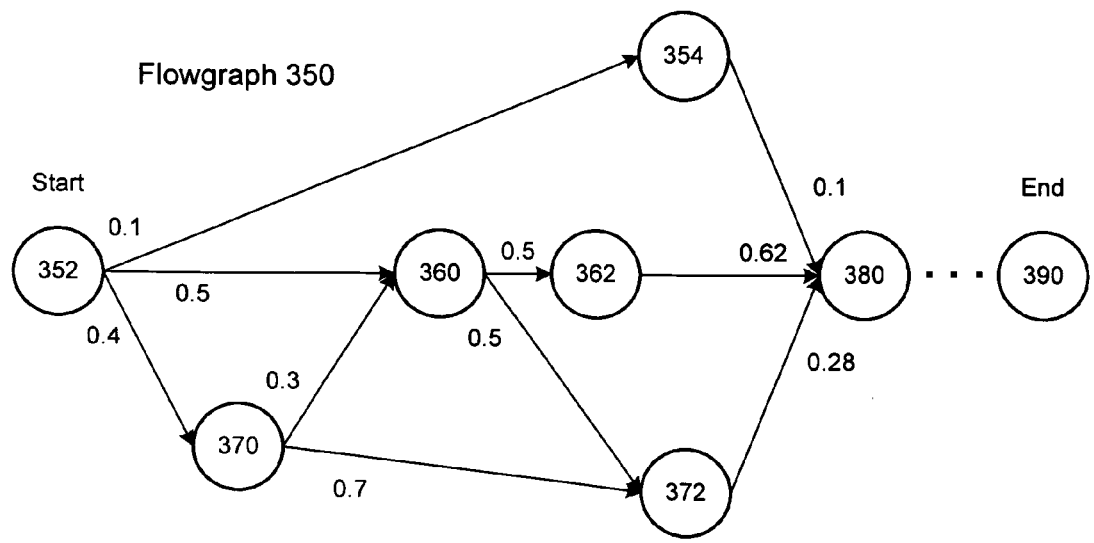
FIG. 3B is a flowgraph of a non-linear computation that may be routed for execution within the multiprocessor system of FIG. 3A.

FIG. 3B depicts a flowgraph demonstrating an illustrative computation that may be routed for execution through the multiprocessor system of FIG. 3A. The computation graphed in flowgraph 350 commences with step or calculation 352. The computation then proceeds via multiple possible branches before terminating at step 390. The computation may end with a single step, operation or calculation or, as depicted in FIG. 3B, it may end with a sequence of linear steps 380 through 390.

At each point or step at which the computation may take different branches, probabilities exist for each branch to indicate how often each branch is followed. For example, after step 352, there is a 10% probability that execution will continue at step 354, a 50% probability that execution will continue at step 360 and a 40% probability that the computation will continue at step 370. The probabilities of each branch being taken are known beforehand, or may be measured over time at the computation is executed repeatedly.

Thus, the probability of arriving at a given step in the computation via a particular path can be calculated by multiplying the probabilities of each edge of flowgraph 350 that lies in that path. Where only one edge leads from a step, the probability of taking that edge is 1.0.

For example, five different paths from step 352 to step 380 are possible: (a) 352-354-380; (b) 352-360-362-380; (c) 352-370-372-380; (d) 352-370-360-362-380; (e) 352-370-360-372-380. Multiplying the probabilities of each edge in each path yields the following probabilities of taking each path: (a) 0.1; (b) 0.5; (c) 0.28; (d) 0.06; (e) 0.06.

However, only three processing steps (i.e., steps 354, 362 and 372) lead directly to step 380. The probability of arriving at step 380 from a particular preceding node can also be calculated, by adding together, for each preceding node, the paths to step 380 that lead through that preceding node.

Thus, there is a 10% probability of reaching step 380 through step 354 (path (a) above), a 56% probability of arriving through step 362 (paths (b) and (d) above) and a 34% probability of arriving at step 380 via step 372 (paths (c) and (e) above).

When a computation such as the computation associated with flowgraph 350 is to be executed in a multiprocessor system such as the system depicted in FIG. 3A, the processors are configured with routing tables indicating how to route the computation. Each step of the computation is executed by a particular processor, which applies a routing table to determine where (i.e., at which processor) the next step will be performed. This information helps determine where the current processor should send results of its calculation or data related to the computation (e.g., which processor, what part of memory). The routing tables may be configured to reflect various routing and/or computational costs, as well as the flow of a computation as reflected in its flowgraph.

A "cost" may include a cost of performing a step of a computation (e.g., in terms of processor time, input/output), a cost of moving data between processors, between memory areas or between a processor and memory, etc. Thus, in one embodiment of the invention, cost may be synonymous with distance. In another embodiment, a cost metric may focus upon marginal delay, which may be calculated as the derivative, with respect to the flow, of the sum of the per-packet (or per-byte) delays multiplied by the rate of packet (or byte) flow. In yet another embodiment, a cost of a step of the computation is derived from a ratio of data rates exiting the step to a data rate entering the step.

Costs for performing the steps of a computation and/or routing data may be calculated by starting at the end of the computation and working backward. And, an algorithm described in the '479 patent may be employed to calculate the cost of any subset of the computation's steps that are aligned in a pipeline sequence (i.e., linearly).

An embodiment of the invention may be described with reference to the processor node graph of FIG. 3A and the flowgraph of FIG. 3B. In this discussion, a separate "phase" of the computation corresponds to each edge of flowgraph 350 that is followed during execution of the computation, and each node in flowgraph 350 corresponds to a "step" of the computation. An edge also indicates a point-to-point connection over which data may be transferred between processors, between a processor and memory or between memory areas.

Thus, each phase refers to what goes on between steps of the computation, and each step is performed at one of the processor nodes of FIG. 3A. Each node of FIG. 3A may correspond to a particular processor node or a particular combination of a specific processor node and a specific area of memory.

From the end of the computation backward, for each phase of the computation, calculations are made to (1) determine a probability for routing traffic from one processor node to another, and (2) determine a cost to assign to the processor nodes that can perform the step that marks the beginning of that phase. That cost is then scaled (e.g., by the ratio of the output data rate to the input data rate of the node performing the step), to produce the cost for the end of the previous phase. That end cost is then multiplied by the distance or cost of the phase (e.g., the distance that data must be moved). The next set of calculations, for the preceding phase of the computation, then determines the branching probability for that phase and a cost to assign to nodes that can do the preceding step, and so on.

For example, assume the link from step 370 to step 360 is phase j, the link from step 352 to step 370 is phase j−1 and the link from step 370 to step 372 is phase j+1. Because the computation is acyclic, it is always possible to assign phase numbers to links in such a way that the numbers assigned to phases entering a step are less than the numbers assigned to phases departing a step.

To compute the cost at the end of phase j−1 (i.e., just before the processing associated with step 370), we do the following. The cost at the start of phase j is multiplied by 0.3 times the ratio of the output data rate of step 370 to the input data rate. We also take the cost at the start of phase j+1 and multiply it by 0.7 times the ratio of the output data rate of step 370 to the input data rate. These two costs are then added to yield the cost at the end of phase j−1.

When multiple phases end at a particular processing step (e.g., step 360), the input data rate for that step is the sum of inputs of the multiple phases.

Referring now to flowgraph 350 of FIG. 3B, a cost of 0 may be assigned to the end (phase) of the computation. Each step i (e.g., any of steps 352, 354, 360, 362, 370, 372, 380) marks a boundary between preceding and succeeding phases. To calculate a cost at a step i for a preceding phase j, the cost of each outgoing phase from step i is multiplied by its data rate and those values are summed. The total sum is then divided by the incoming data rate of phase j. In the case of a single output and a single input, this calculation may be reduced to the scaling factor employed in the '479 patent.

Thus, obtaining a cost at the end of a phase j requires knowledge of the costs at the beginning of phases that succeed phase j. These costs are provided by the applicable routing algorithm, such as that provided in the '479 patent. Illustratively, an initial cost of zero is assigned to the end of the final phase of the computation. Costs of preceding phases can then be determined by working backward.

But, in the case of step 360, for example, where there are multiple input and output phases, multiple calculations are required. The data rates of the input phases connecting steps 352 and 370 to step 360 may be labeled R1 and R2, respectively, and the data rates of output phases connecting step 360 to steps 362 and 372 may be labeled R3 and R4, respectively. The costs at the ends of phases connecting steps 352 and 370 to step 360 may be termed C1 and C2, respectively, while the costs at the start of the phases connecting step 360 to steps 362 and 372 may be termed C3 and C4, respectively. P360 may represent the cost associated with performing step 360 of the computation. Then, costs C1 and C2 may be calculated as follows:

$$C1 = [((R3*C3)+(R4*C4))/R1] + P360; \text{ and}$$

$$C2 = [((R3*C3)+(R4*C4))/R2] + P360$$

In one embodiment of the invention, a data rate (e.g., R1, R2, R3, R4) may be obtained by measuring the traffic at the output from, and input to, a step. We know what the preceding step was, and what the following step will be, so we can measure the rates for each. Because we may divide output rates by input rates, scaling up the level of traffic has no impact.

After the cost is calculated for performing the final, linear steps(s) of the computation (i.e., the pipeline beginning at step 380), which may be done using an algorithm provided by the '479 patent, to continue moving backward the cost associated with the phase ending at step 380 must be apportioned among the possible paths of execution that lead to the final pipeline. As shown in FIG. 3B, multiple branches of execution converge at step 380. Therefore, the cost of the phase ending at step 380 can be multiplied by the probabilities of arriving at step 380 from each of the three possible preceding steps (i.e., steps 354, 362, 372), which were calculated above.

When calculating costs for multiple phases or branches leading from one step (e.g., step 352), the probabilities of each branch being executed are considered. Thus, from step 352, three phases are possible, representing three branches of execution of the computation: one to step 354, another to step 360 and a third to step 370. The cost (or distance) of each phase, which was calculated from the subsequent phase, is multiplied by the ratio of the data rate into step 352 to the data rate from step 352 to each of the three succeeding steps. Then the marginal delay at step 352 is added to each product. Each value is then scaled by the probability of following the corresponding branch of execution (i.e., 0.1, 0.5 or 0.4). If we then add to each value the marginal delay incurred for step 352, we obtain the value that each node that can perform step 352 will advertise for routing the computation along the corresponding branch of execution.

As with the phase leading to step 380, whenever multiple branches of execution converge at a step (e.g., step 360), the cost of the phase ending at that step can be multiplied by the probabilities of arriving at that step via each branch. The probabilities may be normalized. For example, at step 360 the probability of arriving directly from step 352 (i.e., 0.5) is approximately four times greater than arriving from step 370 (i.e., 0.4×0.3=0.12).

When finished with all phases of the computation, branching probabilities have been calculated for each branch, and can be used to route execution of the computation from one processor node to another. In particular, after each step of the computation is executed, the branching probability for the next phase is used to route the next step of the computation to the next processor.

An embodiment of the invention described above differs from a method of the '479 patent in that a processing step i may have multiple phases (i.e., not just one) leading from it (e.g., 'output') or to it (e.g., 'input'). At a given processor performing step i, the processor sees a single cost for a given output phase, and advertises a single cost for a given input phase. This embodiment provides a method for determining the "ending" costs to advertise for each input phase at step i; this cost is then used as the destination cost for each preceding routing phase. Thus, at a single processor performing step i, each phase has a single cost—the cost for that phase and that step at that processor.

A routing table for routing the computational steps is distributed, with each processor node maintaining its own copy of the portions of the routing table that are relevant to it. Each processor's routing table may be updated independently. The table may contain separate entries for each phase of the computation, to tell how or where to move data, and separate entries for each step of the computation, to tell which node can or should perform that step.

The distance (or cost) of a phase from a processor node, as described above, may comprise a cost of moving data between processors, between memory areas or between a processor and memory. Thus, the distance (or cost) of phase n from a processor node performing step 390 may include the cost of writing or transmitting the output of the computation.

Figure 4:
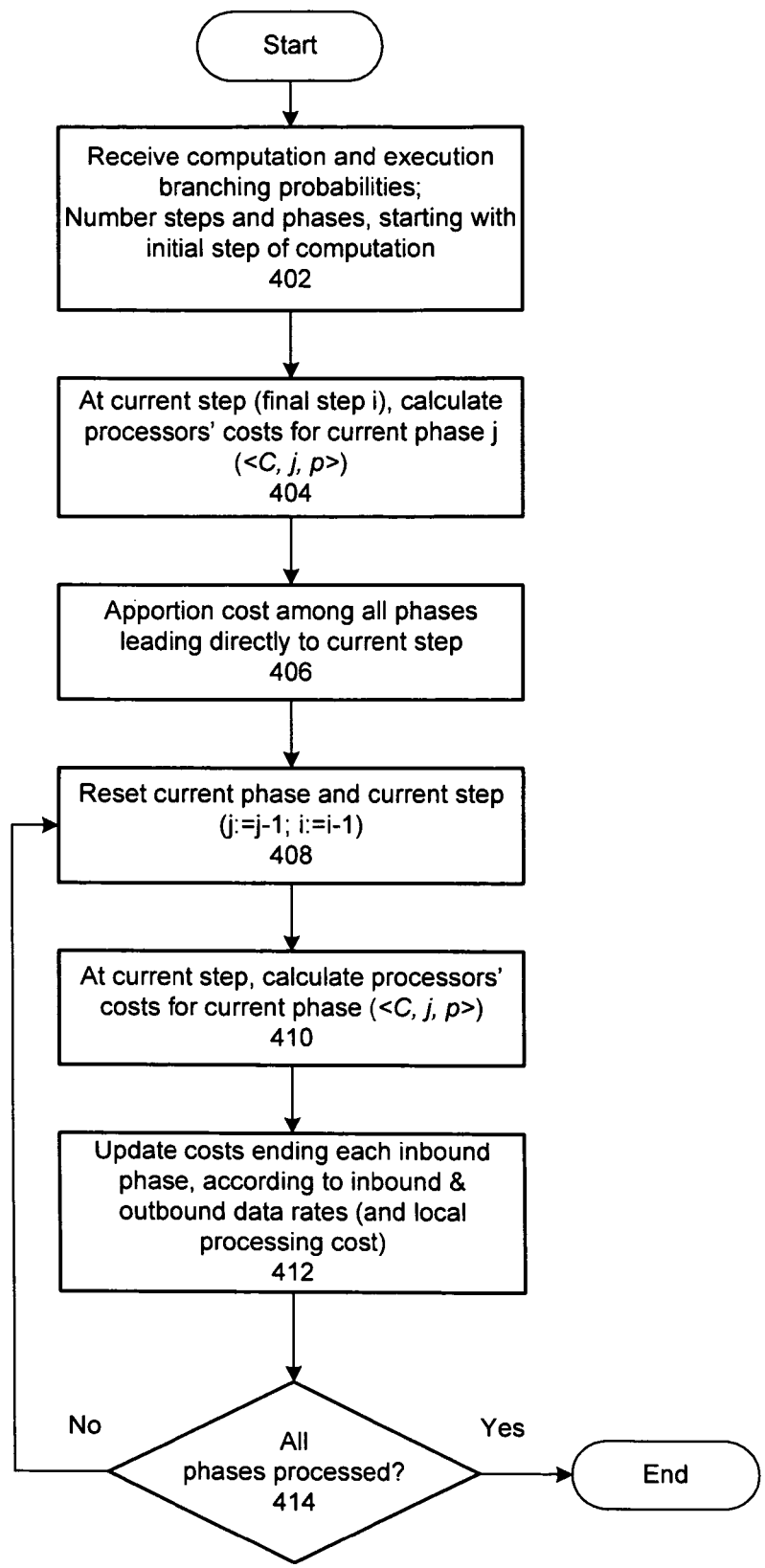
FIG. 4 is a flowchart illustrating one method of load-balancing routing of a non-linear computation, in accordance with an embodiment of the invention.

FIG. 4 is a flowchart demonstrating one method of load-balancing the routing of a multi-step computation within a multiprocessor computing system, according to one embodiment of the invention. The system may comprise any number of processors, in virtually any configuration. Each processor has use of local and/or shared memory.

In operation 402, a computation, application or other program is identified or received for execution at the multiprocessor computing system. The computation includes at least one step at which execution may follow any of multiple branches. Therefore, the computation may be represented by a directed acyclic graph, but will not appear as a single linear or pipeline series of steps.

With the computation, also received is a flowgraph or other means of identifying the probabilities that each branch of the computation will be followed. Some or all steps (node) and phases (edges) of the flowgraph may be labeled.

In particular, in one embodiment of the invention, the flowgraph of the computation is topologically sorted. All steps and phases are then numbered or labeled, with the beginning step of the computation receiving the lowest number or index.

In operation 404, the cost of completing the computation, which may be termed the final phase, is set to zero. The current (and final) phase may be represented as j, and is interpreted as starting at the final step (step i) of the computation (e.g., step 390 of FIG. 3B).

For purposes of assembling a routing table, each processor that is a candidate for (e.g., is capable of) executing the final step i advertises a cost, for the current (final) phase j, equal to the distance (or cost) of the final phase j (i.e., zero) multiplied by the ratio of the output data rate of step i to the input data rate of step i, plus the marginal delay of performing step i.

The costs for a phase for different processors may be represented in the form $<C, j, p>$, wherein C represents cost, j represents current phase j, and p represents processor p. Thus, illustrative processors 1 and 2 would advertise costs for phase j as $<C_1, j_1, 1>$ and $<C_2, j_2, 2>$.

In operation 406, the cost of the current phase (e.g., final phase j) is scaled to each phase (e.g., phase j−1, j−2) preceding the current step (e.g., final step i). If only one phase leads directly to the current step (i.e., the two steps are in a pipeline configuration), as with the phase connecting step 380 to step 390 in FIG. 3B, then the full cost of the current phase is passed on to the preceding phase.

If, however, there are multiple phases (i.e., flowgraph edges) leading directly to the current step, then the cost of the current phase is multiplied by each preceding phase's probability of being followed. This yields the cost of the current phase to be applied to each branch of execution. As described above, these probabilities may be historical in nature, may be approximated, may be updated as the computation is executed, etc.

In operation 408, one of the preceding phases becomes the "current phase," and the step that initiates that phase becomes the "current step." In other words, one of the phases before the present phase j (e.g., phase j−1, phase j−2) becomes phase j, and (one of) the step(s) preceding step i becomes step i. If there are multiple preceding phases, they may be handled in some sequence or may be handled in parallel.

Thus, in different embodiments of the invention, the illustrated method may traverse the computation depth-first (i.e., by following one particular branch backward and then coming back to a different branch) or breadth-first (i.e., by considering all branches or phases equidistant from the end before going to the phases next-furthest from the end, etc.).

In operation 410, the cost of the current phase is calculated, possibly using an algorithm described in U.S. Pat. No. 6,658, 479. A different minimum-delay or other suitable algorithm may also be applied. Illustratively, the cost may include the distance/cost of moving data associated with the transition from the current step to the following step plus the marginal delay of executing the current step.

In operation 412, if the current phase is one of multiple phases leading from the current step, then costs associated with the phases are updated as described above. For example, for each inbound phase to the current step, each outbound phase's data rate is multiplied by its cost, and these products are added together and divided by the inbound phase's data rate. This value is added to the processing cost for the current step to determine the destination cost for the inbound phase.

In one alternative embodiment of the invention, the cost of a current phase is scaled (for purposes of calculating routing costs) by the probability of actually executing that phase. Thus, the cost calculated for the current phase in operation 410 may be multiplied by the probability of following the current phase from the current step. If the current phase is the only phase leading from the current step, no scaling is required.

Each processor that is a candidate for executing the current step will advertise the resulting routing costs to its neighbors.

In operation 414, it is determined whether routing costs for all phases of the computation have been calculated. If not, the method of FIG. 4 returns to operation 408 to reset the current phase and current step, and the method continues.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of calculating routing costs for a multi-step computation in a multiprocessor computing system, comprising:
    calculating a link cost at a current step of the computation, wherein said link cost comprises:
    a communication cost of routing data from a current processor configured to execute the current step of the computation to a subsequent processor configured to execute a subsequent step of the computation; and
    a link cost at the subsequent step of the computation multiplied by a ratio of data input rates to data output rates at the current processor;
    determining whether multiple paths of execution of the computation exist from the current step; and
    if multiple paths of execution exist from the current node, adjusting the calculated link cost by a probability that execution of the computation will follow a path proceeding directly from the current step to the subsequent step.

2. The computer-implemented method of claim 1, further comprising:
    if a plurality of paths of execution of the computation lead directly from previous steps of the computation to the current step, adjusting the calculated link cost by a probability that execution of the computation will reach the current step from a first previous step.

3. The computer-implemented method of claim 1, wherein the cost metric for measuring the communication cost comprises a marginal delay.

4. A computer readable medium storing instructions that, when executed by a computer, cause the computer to perform a method of calculating routing costs for a multi-step computation in a multiprocessor computing system, comprising:
    calculating a link cost at a current step of the computation, wherein said link cost comprises:
    a communication cost of routing data from a current processor configured to execute the current step of the computation to a subsequent processor configured to execute a subsequent step of the computation; and
    a link cost at the subsequent step of the computation multiplied by a ratio of data input rates to data output rates at the current processor;
    determining whether multiple paths of execution of the computation exist from the current step; and
    if multiple paths of execution exist from the current node, adjusting the calculated link cost by a probability that execution of the computation will follow a path proceeding directly from the current step to the subsequent step.

5. A computer-implemented method for load-balanced data routing in a multiprocessor computing system, the method comprising:
    determining a link cost for routing data for a computation through at least one processor node in a multiprocessor computing system in which the computation is executed, the link cost including:
    a communication cost for a given current node configured to execute a first step of the computation;
    a processing node cost for the given current node, the processing node cost including a link cost update from a successor node adjusted by a scaling factor to account for traffic generated by the given current node, wherein the successor node is configured to execute a second step of the computation; and
    a probability that said first step of the computation and said second step of the computation will be consecutively executed; and
    routing data from a given current node to at least one successor node until a destination node is reached, said routing being in accordance with the determined link costs for the at least one current node in the multiprocessor computing system.

6. The computer-implemented method of claim 5, wherein the metric used to measure the link cost comprises a marginal delay.

7. The computer-implemented method of claim 5, wherein said routing data comprises:
    determining a best successor node to a given current node, the best successor node having the lowest link cost; and
    routing data to the best successor node.

8. The computer-implemented method of claim 5, wherein said routing data comprises:
    for a given current node, using the link cost associated with the given current node to calculate routing parameters for the given current node; and routing data to the given current node in accordance with the calculated routing parameters.

9. A computer-implemented method for minimizing delay in routing data in a multiprocessor computing system, the method comprising:
for each current node of the multiprocessor computing system, beginning from a destination node, determining a successor set of nodes to a given current node;
determining a link cost associated with routing data from the given current node to each node in the successor set, said determining comprising:
factoring in a scaling factor to account for additional traffic generated by the given current node, the scaling factor comprising a ratio of data input rates to data output rates at the given current node; and
adjusting the link cost by the probability of routing data from the given current node to the node in the successor set; and
at each current node, beginning from a source node, routing data to one or more nodes in a successor set corresponding to the current node, the routing being in accordance with the determined link costs.

10. The computer-implemented method of claim 9, wherein:
a given current node corresponds to execution of a first step of a computation executed in the multiprocessor computing system;
a subset of nodes in the successor set to the given current node correspond to execution of subsequent steps of the computation immediately subsequent to the first step; and
the probability of routing data from the given current node to a node in the subset is derived from the probability of executing the corresponding subsequent step of the computation immediately after executing the first step of the computation.

11. The computer-implemented method of claim 10, wherein said routing data to one or more successor nodes in accordance with the determined link comprises:
determining a best successor node to a given current node, the best successor node corresponding to the subsequent step most likely to be executed after the first step; and
routing data to the best successor node.

12. The computer-implemented method of claim 9, wherein said routing data to one or more successor nodes in accordance with the determined link comprises:
calculating a set of routing variables for each current node, the routing variables determining a fraction of the data to be routed to a given current node; and
routing data to one or more successor nodes in the successor set in accordance with the routing variables.

13. The computer-implemented method of claim 9, wherein said routing data to one or more successor nodes in accordance with the determined link comprises:
determining a best successor node to a given current node, the best successor node having the lowest link cost; and
routing data to the best successor node.

14. The computer-implemented method of claim 9, wherein the cost metric for the link cost comprises a marginal delay.

15. A computer-implemented method for minimizing delay in routing data in a multiprocessor computing system configured to execute a non-linear multi-step computation, the method comprising:
for each current node of the multiprocessor computing system, beginning from a destination node, determining a successor set of successor nodes to a given current node, wherein:
the given current node corresponds to execution of a first step of the computation; and
a subset of the successor nodes correspond to execution of steps of the computation immediately subsequent to the first step;
for each successor node in the successor set, calculating a link cost of routing data from the given current node to a successor node, said calculating comprising:
calculating a processing node cost by adjusting a link cost update from a given successor node by a scaling factor corresponding to the given current node, the scaling factor accounting for additional traffic generated by the given current node;
combining the processing node cost with a communication cost, the communication cost corresponding to a cost of routing data on a communication channel between the given current node and the given successor node; and
if the given successor node corresponds to execution of a step of the computation immediately subsequent to the given current node, adjusting the link cost by a probability of executing the subsequent step immediately after the first step is executed; and
for each current node between the source node and the destination node in the multiprocessing computing system, including the source node, routing the data from the current node to a successor node in accordance with the determined link costs.

16. The computer-implemented method of claim 15, wherein:
the computation comprises multiple branches of execution from the first step; and
the probability of executing said subsequent step is proportional to the probability that execution of the computation will proceed, from said first step, on a branch leading directly from said first step to said subsequent step.

17. The computer-implemented method of claim 16, wherein routing the data to a successor node in accordance with the determined link costs comprises:
applying probabilities of executing each of the multiple branches to determine a first branch for execution of the computation to follow; and
routing the data to the successor node corresponding to a next step of the computation on the first branch of execution.

18. The computer-implemented method of claim 15, wherein routing the data to a successor node in accordance with the determined link costs comprises:
calculating a set of routing variables for each current node, the routing variables determining a fraction of the data to be routed to a given current node; and
routing data to a successor node in the successor set in accordance with the routing variables.

19. The computer-implemented method of claim 15, wherein routing the data to a successor node in accordance with the determined link costs comprises:
determining a best successor node to a given current node, wherein the best successor node is the successor node having the lowest link cost; and
routing data to the best successor node.

20. The computer-implemented method of claim 15, wherein the cost metric for measuring the communication cost and for measuring the processing node cost comprises a marginal delay.

21. A computer readable medium storing instructions that, when executed by a computer, cause the computer to perform a method for minimizing delay in routing data in a multiprocessor computing system configured to execute a non-linear multi-step computation, the method comprising:

for each current node of the multiprocessor computing system, beginning from a destination node, determining a successor set of successor nodes to a given current node, wherein:

the given current node corresponds to execution of a first step of the computation; and a subset of the successor nodes correspond to execution of steps of the computation immediately subsequent to the first step;

for each successor node in the successor set, calculating a link cost of routing data from the given current node to a successor node, said calculating comprising:

calculating a processing node cost by adjusting a link cost update from a given successor node by a scaling factor corresponding to the given current node, the scaling factor accounting for additional traffic generated by the given current node;

combining the processing node cost with a communication cost, the communication cost corresponding to a cost of routing data on a communication channel between the given current node and the given successor node; and if the given successor node corresponds to execution of a step of the computation immediately subsequent to the given current node, adjusting the link cost by a probability of executing the subsequent step immediately after the first step is executed; and for each current node between the source node and the destination node in the multiprocessing computing system, including the source node, routing the data from the current node to a successor node in accordance with the determined link costs.

* * * * *